(12) United States Patent
Aboutalib et al.

(10) Patent No.: US 10,073,454 B2
(45) Date of Patent: Sep. 11, 2018

(54) MACHINE VISION ENABLED SWARM GUIDANCE TECHNOLOGY

(71) Applicant: NORTHROP GRUMMAN SYSTEMS CORPORATION, Falls Church, VA (US)

(72) Inventors: Omar Aboutalib, Diamond Bar, CA (US); David W. Evans, Signal Hill, CA (US); Gregory L. Larson, Palos Verdes, CA (US); Annie D. Nguyen, Fountain Valley, CA (US); Richard R. Ramroth, Long Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 329 days.

(21) Appl. No.: 15/073,403

(22) Filed: Mar. 17, 2016

(65) Prior Publication Data

US 2018/0164820 A1 Jun. 14, 2018

(51) Int. Cl.
*G05D 1/00* (2006.01)
*B64C 39/02* (2006.01)
(Continued)

(52) U.S. Cl.
CPC ........... *G05D 1/0094* (2013.01); *B64C 39/02* (2013.01); *B64C 39/024* (2013.01); *G05D 1/00* (2013.01); *G06K 9/0063* (2013.01); *G06K 9/6202* (2013.01); *G06T 7/74* (2017.01); *H04N 7/185* (2013.01); *B64C 2201/082* (2013.01);
(Continued)

(58) Field of Classification Search
CPC ...... G05D 1/0094; G05D 1/00; B64C 39/024; B64C 2201/121; B64C 2201/082; B64C 2201/102; B64C 39/02; G06K 9/6202; G06K 9/0063; G06K 2209/21; G06T 7/74; G06T 2207/30252; G06T 2207/30212; G06T 2207/10048; H04N 7/185;
(Continued)

(56) References Cited

U.S. PATENT DOCUMENTS 6,960,750 B2  11/2005  Doane
7,107,148 B1   9/2006  Bodin et al.
(Continued)

OTHER PUBLICATIONS

Manyam, Satyanarayana G. et al. "Routing of Two Unmanned Aerial Vehicles with Communication Constraints" International Conference on Unmanned Aircraft Systems (ICUAS) IEEE, USA May 27-30, 2014, pp. 140-148.
(Continued)

*Primary Examiner* — Bernarr E Gregory
(74) *Attorney, Agent, or Firm* — John A. Miller; Shumaker, Loop & Kendrick, LLP (57) ABSTRACT

A system and method for controlling a swarm of UAVs that are stored on and released from an airborne platform, fly to and destroy a target, where the UAVs download target information from the airborne platform before being released therefrom, do not communicate with each other or the airborne platform while in flight, and do not depend of the presence of GPS. Each UAV includes a vision sensor that provides image data, a navigation module that receives the image data and causes the UAV to navigate and fly towards the target, and a target destruction module that receives the image data and causes the UAV to destroy the target.

18 Claims, 5 Drawing Sheets

(51) Int. Cl.
  *G06K 9/62* (2006.01)
  *G06K 9/00* (2006.01)
  *H04N 7/18* (2006.01)
  *G06T 7/73* (2017.01)
  *B64C 39/00* (2006.01)

(52) U.S. Cl.
  CPC .. *B64C 2201/102* (2013.01); *B64C 2201/121* (2013.01); *G06K 2209/21* (2013.01); *G06T 2207/10048* (2013.01); *G06T 2207/30212* (2013.01); *G06T 2207/30252* (2013.01)

(58) Field of Classification Search
  CPC ........ F41G 7/2206; F42B 15/01; F42B 15/10; F42B 15/105
  See application file for complete search history.

(56) References Cited

U.S. PATENT DOCUMENTS

| | | | |
|---|---|---|---|
| 7,158,877 B2 | 1/2007 | Carlsson et al. | |
| 7,231,294 B2 | 6/2007 | Bodin et al. | |
| 7,338,009 B1 * | 3/2008 | Bobinchak | F41G 7/2206 244/3.1 |
| 7,418,320 B1 | 8/2008 | Bodin et al. | |
| 7,451,023 B2 | 11/2008 | Appleby et al. | |
| 7,469,183 B2 | 12/2008 | Bodin et al. | |
| 7,494,089 B2 * | 2/2009 | Williams | F41G 7/2206 102/473 |
| 7,494,090 B2 * | 2/2009 | Leal | F41G 7/2206 102/473 |
| 7,546,187 B2 | 6/2009 | Bodin et al. | |
| 7,737,878 B2 | 6/2010 | Van Tooren et al. | |
| 7,947,936 B1 * | 5/2011 | Bobinchak | F42B 15/01 244/3.1 |
| 7,970,507 B2 | 6/2011 | Fregene et al. | |
| 8,084,724 B1 * | 12/2011 | Brosch | F41G 7/2206 244/158.1 |
| 8,089,033 B2 * | 1/2012 | Zank | F42B 15/105 244/175 |
| 8,186,589 B2 | 5/2012 | Ben Asher et al. | |
| 8,379,967 B1 | 2/2013 | Bush et al. | |
| 8,386,096 B2 | 2/2013 | Stimac et al. | |
| 8,463,463 B1 | 6/2013 | Feldmann et al. | |
| 8,575,526 B1 * | 11/2013 | Colvin | F42B 15/01 244/3.1 |
| 8,708,285 B1 * | 4/2014 | Carreiro | F42B 15/10 244/190 |
| 8,778,121 B2 | 7/2014 | Klinger | |
| 8,781,727 B1 | 7/2014 | Bonawitz et al. | |
| 8,862,285 B2 | 10/2014 | Wong et al. | |
| 8,874,360 B2 | 10/2014 | Klinger et al. | |
| 8,985,504 B2 | 3/2015 | Tao et al. | |
| 9,102,406 B2 | 8/2015 | Stark et al. | |
| 9,104,201 B1 | 8/2015 | Pillai et al. | |
| 9,108,713 B2 | 8/2015 | Tao et al. | |
| 2006/0167596 A1 | 7/2006 | Bodin et al. | |
| 2006/0167622 A1 | 7/2006 | Bodin et al. | |
| 2007/0040061 A1 * | 2/2007 | Williams | F41G 7/2206 244/3.1 |
| 2009/0030566 A1 | 1/2009 | Bodin et al. | |
| 2010/0320312 A1 * | 12/2010 | Bril | F41G 7/2206 244/3.16 |
| 2015/0105946 A1 | 4/2015 | Kumar et al. | |
| 2015/0142211 A1 | 5/2015 | Shehata et al. | |
| 2015/0203201 A1 | 7/2015 | Tao et al. | |
| 2015/0234387 A1 | 8/2015 | Mullan et al. | |

OTHER PUBLICATIONS

Sujit P. B. et al. "Multi-UAV TAsk Allocation with Communication Faults" American Control Conference, Montreal Canada, ACCC, Jun. 27-29, 2012, pp. 3724-3729.

* cited by examiner

FIG - 7

MACHINE VISION ENABLED SWARM GUIDANCE TECHNOLOGY

BACKGROUND

Field

This invention relates generally to a system and method for controlling a swarm of unmanned aerial vehicles (UAVs) configured to be released from an airborne platform, fly to and destroy a set of enemy targets and, more particularly, to a system and method for controlling a swarm of UAVs configured to be released from an airborne platform, fly to and destroy a set of enemy targets, where each UAV is relatively inexpensive, does not communicate with any other UAV in the swarm or the platform while in flight, and is equipped with a vision sensor that allows it to navigate in a GPS or GPS-denied environment, and seek out and identify the assigned targets.

Discussion

The recent emergence of decentralized and asymmetric threats to global security is causing the military to rely on innovative technologies for surveillance, reconnaissance and targeting. To this end, the military is increasingly relying on the deployment of UAVs for surveillance and targeting of potential threats to minimize the harm to military personnel. The military is exploring the utility of a large number of UAVs that autonomously converge on an adversary and its key assets, decide on a course of action, and then engage the enemy without direct intervention from a central command and control.

UAV swarms are an emerging military technology that can provide a solution to a variety of problems on the modern battlefield. A swarm of UAVs has the advantage that it can overwhelm an enemy target through sheer numbers as current enemy defense systems are not designed to defend against massive attacks carried out by hundreds of armed unmanned vehicles. For example, swarming UAVs could play a key role in the destruction of enemy assets by attacking a target, such as an enemy defense system, through a large number of UAVs to overwhelm the target. In a surveillance mission, a swarm of UAVs can quickly map an area of enemy activity and provide timely and critical intelligence. Swarm technology can also support search and rescue operations where multiple UAVs are able to search an area for military personnel in danger, and relay information back to a rescue team.

Known swarm UAVs often rely on GPS signals to identify their location as well as the target locations. However, GPS can be jammed by enemy defense systems through various counter measures. Further, known swarm UAVs often communicate with each other while in flight to better engage the target, which provides added expense to the UAV.

SUMMARY

The present invention discloses and describes a system and method for controlling a swarm of UAVs that are stored on and released from an airborne platform, fly to and destroy a target, where the UAVs download target information from the airborne platform before being released therefrom, do not communicate with each other or the airborne platform while in flight, and do not depend on the presence of GPS signals. Each UAV includes a vision sensor that provides image data, a navigation module that receives the image data from the vision sensor, and causes the UAV to fly towards the target, and a target destruction module that receives the image data and identifies an aim-point that causes the UAV to effectively destroy the target.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for controlling a swarm of UAVs is merely exemplary in nature, and is in no way intended to limit the invention or its applications or uses.

As will be discussed in detail below, the present invention proposes a system and method for controlling a swarm of UAVs stored on and released from an airborne platform that are configured to engage and destroy one or more enemy targets. As will be discussed, the UAVs are inexpensive munitions that are capable of receiving targeting instructions from the airborne platform prior to being released therefrom, and include a suitable vision sensor, such as an IR sensor, that allows the UAV to navigate, identify and fly to the target. Each UAV is autonomous while in flight in that it does not communicate with either the mobile platform or any of the other UAV in the swarm. Further, the UAVs do not depend on the presence of GPS for navigation and targeting, and as such are not subject to anti-GPS jamming by the enemy.

Figure 1:
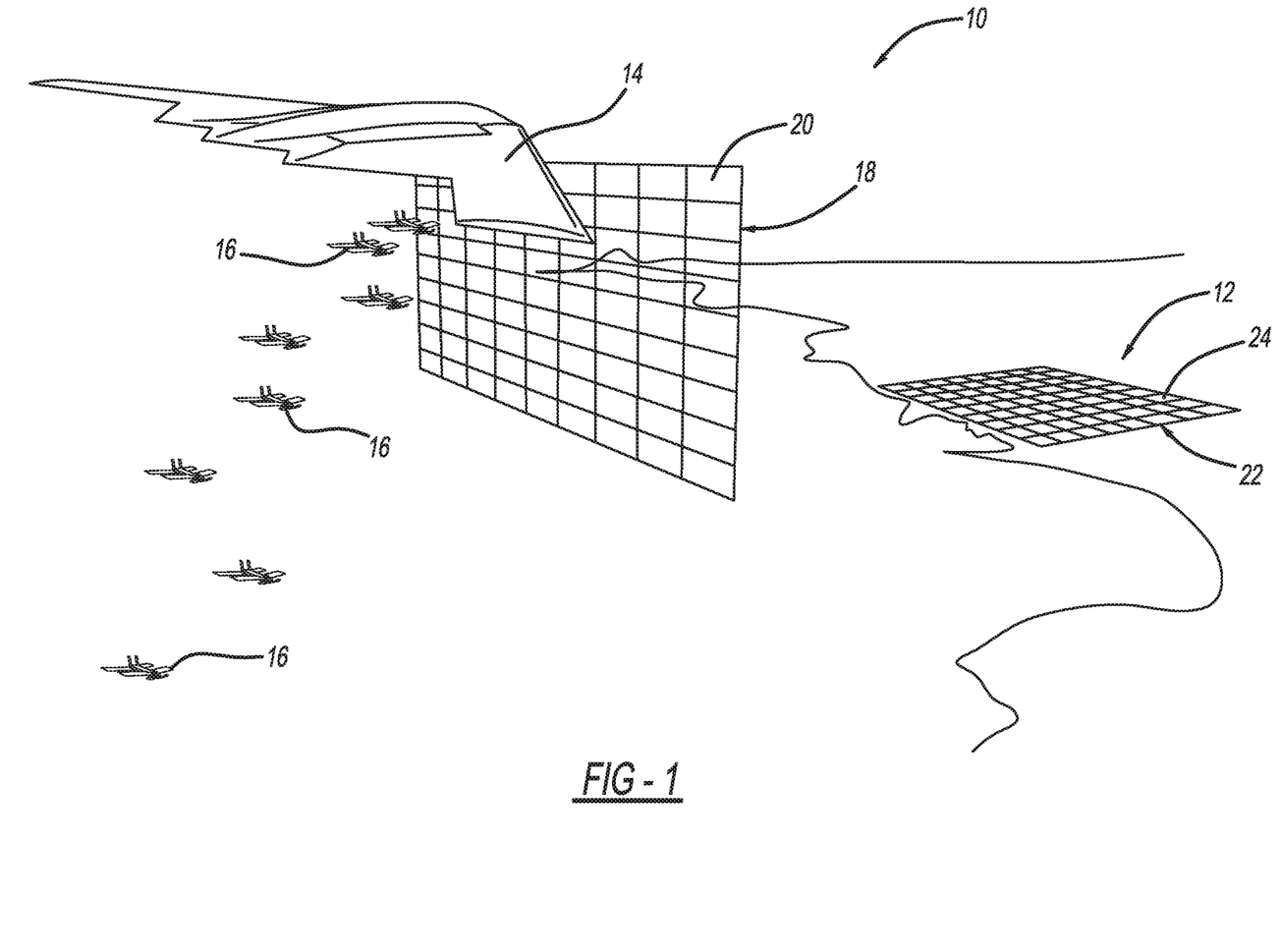
FIG. 1 is an illustration of a warfare scene showing a swarm of UAVs released from a B2 bomber and flying towards a target engagement area.

FIG. 1 is an illustration of a warfare scene 10 including a target engagement area 12 that is being targeted by a mobile platform, specifically a B2 bomber 14. Although the description herein refers to the mobile platform as being the B2 bomber 14, other mobile platforms that are able to store and deploy a large number of small UAVs is also applicable. The engagement area 12 can be any enemy target area to be destroyed, and can include radar installations, air defense systems, enemy tanks, etc. The B2 bomber 14 releases a swarm of UAVs 16, such as hundreds of the UAVs 16, at some predetermined distance from the engagement area 12, such as 50-200 km. The illustration in FIG. 1 shows a grid structure 18 including cells 20 superimposed in the air and a grid structure 22 including cells 24 superimposed over the engagement area 12, where the grid structures 18 and 22 are not part of the warfare scene 10, but are shown for illustration purposes. Prior to being released from the B2 bomber 14, each of the UAVs 16 downloads targeting information and other data from the bomber 14 that is stored on the UAV 16 and identifies a specific target location in the engagement area 12. The targeting information provided to each of the UAVs 16 may cause the UAV 16 to fly through a particular one of the cells 20 in the grid structure 18 towards the engagement area 12 and to a particular target identified by one of the cells 24 in the grid structure 22. As will be discussed, each of the UAVs 16 uses vision technology to identify the engagement area 12 and the specific target location. Each of the cells 20 and 24 in the grid structures 18 and 22 may be defined for a separate one of the UAVs 16, a plurality of the UAVs 16 or none of the UAVs 16.

Figure 2:
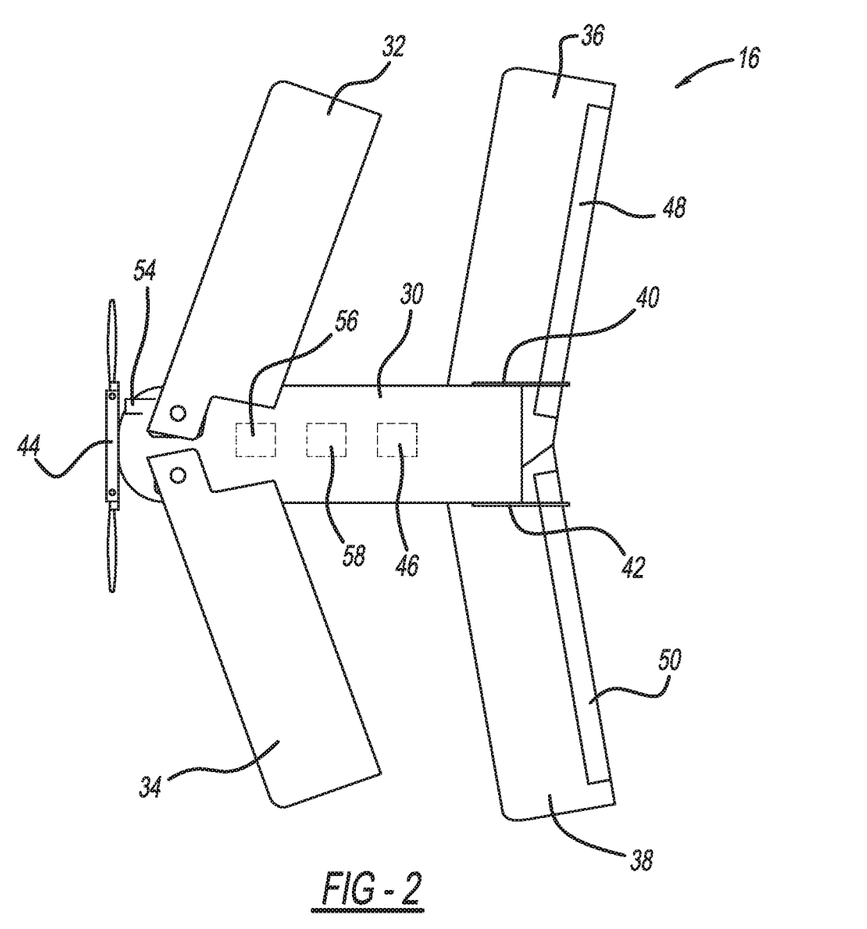
FIG. 2 is a top view of one of the UAVs shown in FIG. 1.
Figure 3:
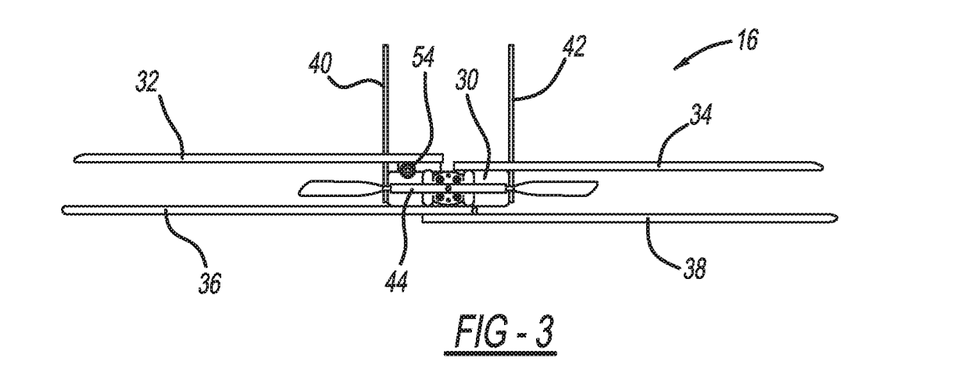
FIG. 3 is a front view of the UAV shown in FIG. 2.

FIG. 2 is a top view and FIG. 3 is a front view of one of the UAVs 16 that includes a main body 30, where other types of UAVS may be equally applicable. In this non-limiting embodiment, the UAV 16 includes a pair of fore wings 32 and 34 pivotally attached to a top surface of the main body 30 and a pair of aft wings 36 and 38 pivotally attached to a bottom surface of the main body portion 30, where the wings 32, 34, 36 and 38 can be retracted for compact storage on the B2 bomber 14. Further, a pair of tail members 40 and 42 is attached to opposing sides of the main body 30 proximate the aft wings 36 and 38, as shown. A propeller 44 is rotatably mounted to a front end of the main body 30 and is powered by a power source 46, such as a suitable battery. Each of the wings 36 and 38 includes a pivotable elevon 48 and 50, respectively, to control the flight direction of the UAV 16. The UAV 16 also includes a vision sensor 54 that is able to identify the engagement area 12, and can be any suitable vision sensor for the purposes discussed herein, such as an imaging sensor, a visible light camera, an electro-optical short/medium wave or long wave infrared camera, etc. The vision sensor 54 can detect and track features of opportunity on the ground for GPS-denied navigation, and detect and identify the target, as discussed herein. Once the UAV 16 is near the specific target, it may employ the vision sensor 54 to detect hot or cold target features, such as engines, tracks, etc. for target identification and aim-point selection. The UAV 16 also includes suitable munitions 58, such as a five pound bomb, to destroy the target.

The UAV 16 also includes a controller 56 that receives the downloaded targeting information from the B2 bomber 14 and controls the flight of the UAV 16 based on the images provided by the sensor 54 as discussed herein. The controller 56 will provide automatic target detection and recognition using images from the sensor 54 and can include an algorithm for detecting and extracting regions of interest, a feature extraction algorithm to extract features that best describe the target, a supervised-learning algorithm for clutter rejection and/or target identification, and a nearest-neighbor correlation algorithm for aim-point selection. Further, the controller 56 can use flex targeting that does not require the UAVs 16 to learn about a specific target and to recognize that target, where the flight direction of the UAV 16 is directed to an aim-point. Data can be provided to the controller 56 by the B2 bomber 14 to identify a small set of physical features that are intrinsic to a particular target of interest, and has the potential for discrimination against decoys in contested areas.

Figure 4:
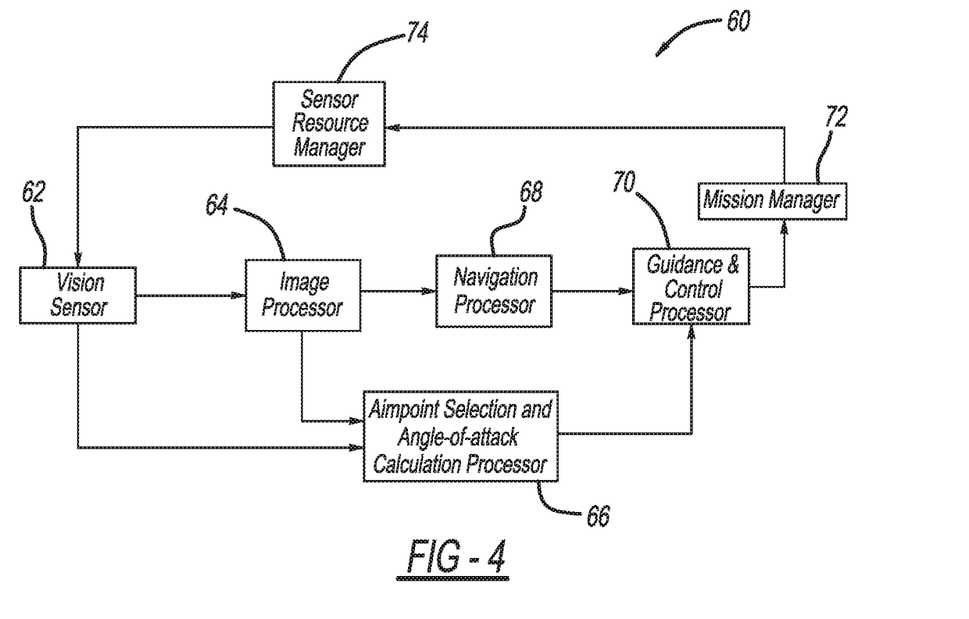
FIG. 4 is a functional block diagram of a swarm control system.

FIG. 4 is a functional block diagram of a swarm control system 60 provided on each UAV 16 as discussed above, where image data from a vision sensor 62, representing the sensor 54, is provided to an image processor 64 that searches, finds, recognizes and tracks a particular target. The processed data from the processor 64 and the image data from the sensor 62 are provided to an aim-point selection and angle-of-attack calculation processor 66 that provides the calculations for flight control necessary to engage and destroy the target. The processed data from the processor 64 is also provided to a navigation processor 68 that provides the UAV navigation control. The navigation control signals from the processor 68 and the target destruction signals from the processor 66 are sent to a guidance and control processor 70 that controls the flight of the UAV 16, where the guidance and control signals are provided to a mission manager 72. The guidance and control signals are used by the mission manager 72 to direct the sensor 62 to the desired location to image the target. That information is provided to a sensor resource manager 74 that causes the sensor 62 to be directed in the proper direction depending on the location of the UAV 16 during its flight.

Figure 5:
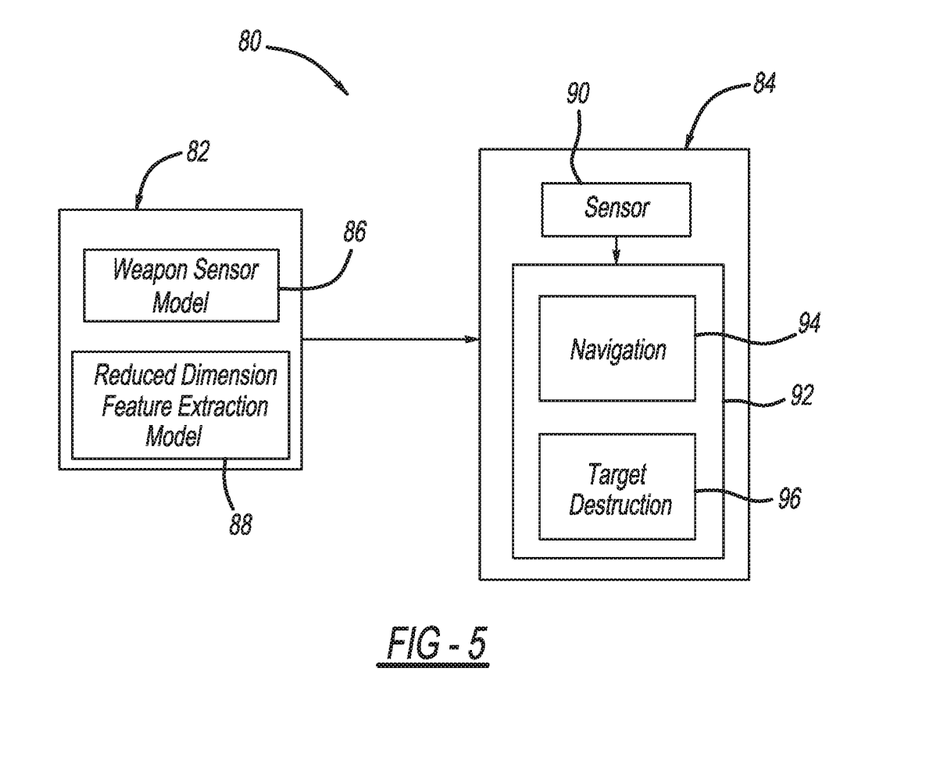
FIG. 5 is a block diagram of a swarm system including a navigation module and a target destruction module.

FIG. 5 is a block diagram of a swarm system 80 including box 82 representing the B2 bomber 14 and box 84 representing one of the UAVs 16. During mission planning, the box 82 employs a weapon sensor model 86 that identifies the sensor 54 on the UAV 16 and provides target type and state and environment information to a reduced dimension feature extraction model 88. The extraction model 88 constructs the grids 18 and 22 and a target contour dome over the area 12. The feature extraction model 88 then downloads the feature dome and contour dome and target information to the box 84. The box 84 includes a sensor 90 representing the vision sensor 54 and a controller 92 representing the controller 56, where sensor data is provided by the sensor 90 to the controller 92. The controller 92 performs two functions using the sensor data as discussed above and in more detail below, namely, UAV navigation in a module 94 and target destruction in a module 86.

Figure 6:
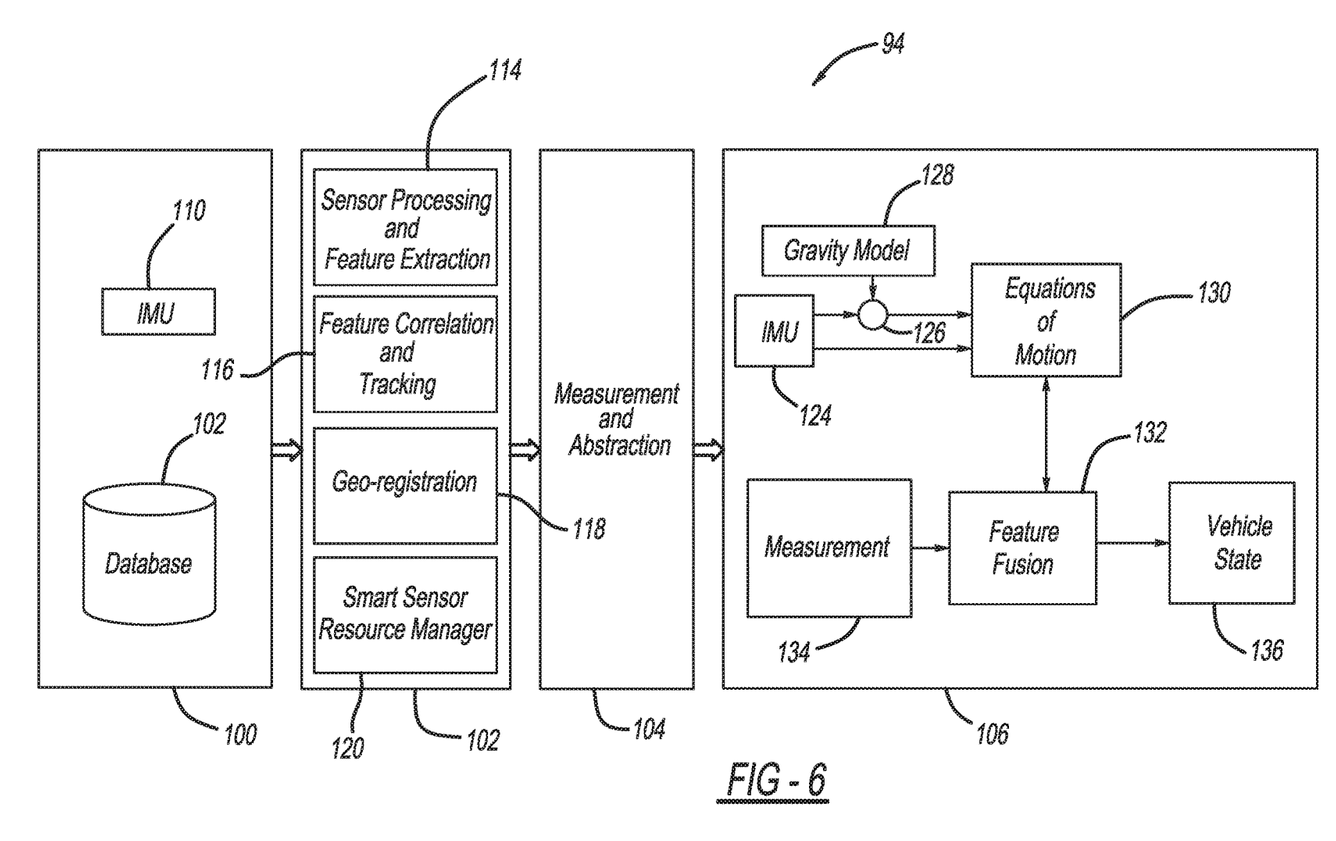
FIG. 6 is a block diagram of the navigation module shown in the swarm system of FIG. 5.

FIG. 6 is a block diagram of the navigation module 94 and includes a sensing layer 100, a processing layer 102, a measurement and abstraction layer 104 and a GPS-denied navigation and fusion layer 106. The sensing layer 90 includes weapons navigation sensors, namely, an inertial measurement unit (IMU) 110 and weapons databases 112 that identify digital terrain and landmarks in the engagement area 12. Data from the sensor 90, the IMU 110 and the weapons databases 112 is provided to the processing layer 102 that provides sensor processing and environment feature detection at box 114, feature correlation and tracking at box 116, geo-registration at box 118 and smart sensor resource management at box 120. The feature detection data, correlation and tracking data, geo-registration data and resource management data is then provided to the measurement and abstraction layer 104 that extracts measurement data therefrom and provides it to the GPS-denied navigation and fusion layer 106. An on-board IMU 124 provides inertial measurements to a summation junction 126 and adds it to gravity model information from a gravity model 128 to provide an acceleration signal to an equations of motions box 130. Acceleration and angular rate data from the equations of motions box 130 is provided to a feature fusion module 132 along with measurement data from a measurement module 134 to provide vehicle state information of position, velocity, attitude and error estimates at box 136.

Figure 7:
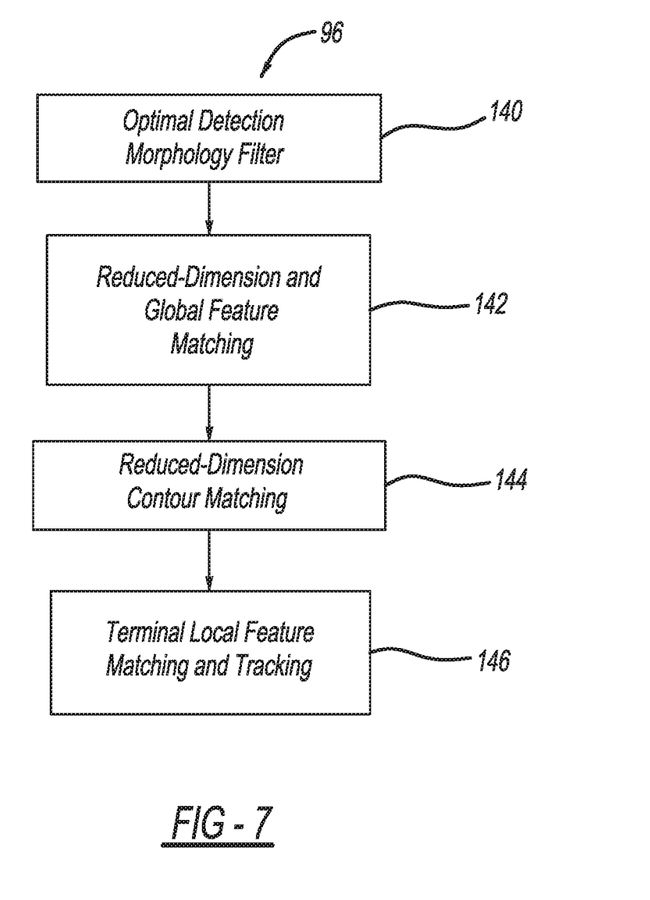
FIG. 7 is a block diagram of the target destruction module shown in the swarm system of FIG. 5.

FIG. 7 is a block diagram of the target destruction module 96 and includes an optimal detection morphology filter 140 that uses the downloaded target information to improve detection and segmentation of the target and reduce the target search space. The filtered target information is provided to a reduced-dimension and global feature matching module 142 that identifies invariant target features, provides target feature matching, provides a pose estimate of elevation angle and target aspect angle, and provides target verification and tracking. The global feature matching data is provided to a reduced-dimension contour matching module 144 that provides contour extraction and matching, target verification and tracking and interpolates a target contour based on the given poses. The contour matching data is provided to a terminal local feature matching and tracking module 146 that provides component matching, ID verification, aim-point selection, local feature tracking, and robust-to-partial occlusions.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A target swarm system comprising:
an airborne platform; and
a plurality of unmanned aerial vehicles (UAVs) configured to be launched from the platform, each UAV including a vision sensor providing image data after the UAV is launched from the platform, a navigation module receiving the image data and causing the UAV to fly towards a target, a target destruction module receiving the image data and causing the UAV to engage the target, and munitions to destroy the target, wherein the airborne platform includes a weapon sensor model that identifies the vision sensor on each UAV and provides target type and state and environment information to each UAV, and a reduced dimension feature extraction model that constructs grids and a target contour dome over the target.

2. The system according to claim 1 wherein the UAVs download target information from the airborne platform before being launched therefrom.

3. The system according to claim 1 wherein the navigation module includes a sensing layer having weapons navigation sensors and weapons databases that identify terrain and landmarks around the target, a processing layer that provides sensor processing and environment feature detection, feature correlation and tracking, geo-registration and sensor resource management, a measurement and abstraction layer that extracts measurement data, and a navigation and fusion layer that provides UAV state information of position, velocity, attitude and error estimates.

4. The system according to claim 1 wherein the target destruction module includes an optimal detection morphology filter that uses downloaded target information to improve detection and segmentation of the target and reduce a target search base, a reduced-dimension and global feature matching module that identifies invariant target features, provides target feature matching, provides a pose estimate of elevation angle and target aspect angle, and provides target verification and tracking, a reduced-dimension contour matching module that provides contour extraction and matching, target verification and tracking and target interpolation, and a terminal local feature matching and tracking module that provides component matching, identification verification, aim-point selection, local feature tracking and robust-to-partial occlusions.

5. The system according to claim 1 wherein the airborne platform is a B2 bomber.

6. The system according to claim 1 wherein the vision sensor is an imaging sensor, a visible light camera, or an electro-optical short/medium wave or long wave infrared camera.

7. The system according to claim 1 wherein each UAV includes retractable wings that are deployed after the UAV is launched from the platform.

8. The system according to claim 1 wherein the plurality of UAVs is hundreds of UAVs.

9. A target swarm system comprising:
an airborne platform; and
a plurality of unmanned aerial vehicles (UAVs) configured to be launched from the platform, each UAV including a vision sensor providing image data after the UAV is launched from the platform and a navigation module receiving the image data and causing the UAV to fly towards a target, wherein the UAVs download target information from the airborne platform before being released therefrom, and do not communicate with each other or the airborne platform after the UAVs are released from the platform, wherein the navigation module includes a sensing layer having weapons navigation sensors and weapons databases that identify terrain and landmarks around the target, a processing layer that provides sensor processing and environment feature detection, feature correlation and tracking, geo-registration and sensor resource management, a measurement and abstraction layer that extracts measurement data, and a navigation and fusion layer that provides UAV state information of position, velocity, attitude and error estimates.

10. The system according to claim 9 wherein the plurality of UAVs is hundreds of UAVs.

11. The system according to claim 9 wherein the vision sensor is an imaging sensor, a visible light camera, or an electro-optical short/medium wave or long wave infrared camera.

12. The system according to claim 9 wherein each UAV includes retractable wings that are deployed after the UAV is launched from the platform.

13. A target swarm system comprising:
an airborne platform; and
a plurality of unmanned aerial vehicles (UAVs) configured to be launched from the platform, wherein the UAVs download target information from the airborne platform before being launched therefrom, each UAV including a vision sensor providing image data after the UAV is launched from the platform, a navigation module receiving the image data and causing the UAV to fly towards a target, a target destruction module receiving the image data and causing the UAV to engage the target, and munitions to destroy the target, wherein the airborne platform includes a weapon sensor model that identifies the vision sensor on each UAV and provides target type and state and environment information to each UAV, and a reduced dimension feature extraction model that constructs grids and a target contour dome over the target, the navigation module includes a sensing layer having weapons navigation sensors and weapons databases that identify terrain and landmarks around the target, a processing layer that provides sensor processing and environment feature detection, feature correlation and tracking, geo-registration and sensor resource management, a measurement and abstraction layer that extracts measurement data, and a navigation and fusion layer that provides UAV state information of position, velocity, attitude and error estimates, and the target destruction module includes an optimal detection morphology filter that uses the downloaded target information to improve detection and segmentation of the target and reduce a target search base, a reduced-dimension and global feature matching module that identifies invariant target features, provides target feature matching, provides a pose estimate of elevation angle and target aspect angle, and provides target verification and tracking, a reduced-dimension contour matching module that provides contour extraction and matching, target verification and tracking and target interpolation, and a terminal local feature matching and tracking module that provides component matching, identification verification, aim-point selection, local feature tracking and robust-to-partial occlusions.

14. The system according to claim 13 wherein the airborne platform is a B2 bomber.

15. The system according to claim 13 wherein the vision sensor is an imaging sensor, a visible light camera, or an electro-optical short/medium wave or long wave infrared camera.

16. The system according to claim 13 wherein each UAV includes retractable wings that are deployed after the UAV is launched from the platform.

17. The system according to claim 13 wherein the plurality of UAVs is hundreds of UAVs.

18. A target swarm system comprising:
an airborne platform; and
a plurality of unmanned aerial vehicles (UAVs) configured to be launched from the platform, each UAV including a vision sensor providing image data after the UAV is launched from the platform, a navigation module receiving the image data and causing the UAV to fly towards a target, a target destruction module receiving the image data and causing the UAV to engage the target, and munitions to destroy the target, wherein the target destruction module includes an optimal detection morphology filter that uses downloaded target information to improve detection and segmentation of the target and reduce a target search base, a reduced-dimension and global feature matching module that identifies invariant target features, provides target feature matching, provides a pose estimate of elevation angle and target aspect angle, and provides target verification and tracking, a reduced-dimension contour matching module that provides contour extraction and matching, target verification and tracking and target interpolation, and a terminal local feature matching and tracking module that provides component matching, identification verification, aim-point selection, local feature tracking and robust-to-partial occlusions.

* * * * *